(12) United States Patent
Hofer et al.

(10) Patent No.: US 10,150,179 B2
(45) Date of Patent: Dec. 11, 2018

(54) HOLLOW PROFILE CONNECTION-GUSSET PLATE

(71) Applicant: MAGNA STEYR Fahrzeugtechnik AG & Co KG, Graz (AT)

(72) Inventors: Bernhard Hofer, Graz (AT); Harald Zachnegger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 14/255,275

(22) Filed: Apr. 17, 2014

(65) Prior Publication Data

US 2014/0314471 A1 Oct. 23, 2014

(30) Foreign Application Priority Data

Apr. 18, 2003 (EP) .................................... 13164327

(51) Int. Cl.
*B23K 20/12* (2006.01)

(52) U.S. Cl.
CPC .......... *B23K 20/127* (2013.01); *B23K 20/129* (2013.01); *B23K 20/1265* (2013.01); *Y10T 403/472* (2015.01)

(58) Field of Classification Search
CPC ..... B62D 27/02; B62D 27/023; Y10T 403/72; Y10T 403/725; Y10T 403/7043; Y10T 403/7096; Y10T 403/66; Y10T 403/551; Y10T 403/55; Y10T 403/553; Y10T 403/555; Y10T 403/44; Y10T 403/443
See application file for complete search history.

(56) References Cited

U.S. PATENT DOCUMENTS

| | | | |
|---|---|---|---|
| 6,247,633 B1* | 6/2001 | White | B23K 20/123 228/112.1 |
| 6,283,159 B1* | 9/2001 | Tada | F16L 9/18 138/111 |
| 2001/0004992 A1 | 6/2001 | Kawasaki | |
| 2002/0050064 A1* | 5/2002 | Furuse | B62D 23/005 29/897.2 |

(Continued)

FOREIGN PATENT DOCUMENTS

| | | |
|---|---|---|
| CN | 1297391 A | 5/2001 |
| CN | 1369336 A | 9/2002 |

(Continued)

OTHER PUBLICATIONS

Office Action and Search Report received for Chinese Patent Application No. 20140272726.0, dated Jan. 4, 2016, 6 pages including 3 pages of English translation.

(Continued)

*Primary Examiner* — Matthieu F Setliff
(74) *Attorney, Agent, or Firm* — Jordan IP Law, LLC; Todd A. Vaughn (57) ABSTRACT

A hollow profile connection to connect at least two hollow profiles via a gusset plate which makes contact with the end regions of the hollow profiles to be connected, in the outer region thereof. At least the end regions of the hollow profiles in cross-section have a profile formed by webs or ribs. The gusset plate is connected to the at least two hollow profiles via a friction-stir weld which run along the ribs or webs of the at least two hollow profiles.

18 Claims, 11 Drawing Sheets

(56) References Cited

U.S. PATENT DOCUMENTS

| | | | | |
|---|---|---|---|---|
| 2005/0016807 A1* | 1/2005 | Braymand | ............ | F16F 7/121 |
| | | | | 188/371 |
| 2006/0005503 A1* | 1/2006 | Bladow | ................ | B62D 21/15 |
| | | | | 156/130.7 |
| 2009/0087255 A1 | 4/2009 | Jorna | | |
| 2010/0244497 A1* | 9/2010 | Honda | ................... | B62D 21/02 |
| | | | | 296/205 |
| 2010/0269326 A1 | 10/2010 | Allehaux et al. | | |
| 2011/0274910 A1* | 11/2011 | Kraushaar | ............ | B62D 21/15 |
| | | | | 428/304.4 |

FOREIGN PATENT DOCUMENTS

| | | |
|---|---|---|
| CN | 101134262 A | 3/2008 |
| DE | 10011593 A1 | 9/2000 |
| DE | 10 2010 003 742 A1 | 10/2011 |
| DE | 10 2010 018 504 A1 | 11/2011 |
| JP | 2001233208 A | 8/2001 |
| JP | 2004261859 A | 9/2004 |
| NL | 1019889 C2 | 8/2003 |

OTHER PUBLICATIONS

Office Action and Search Report for Chinese Patent Application No. 201410272726.0, dated Sep. 13, 2016, 11 pages including 7 pages of English translation.

\* cited by examiner

HOLLOW PROFILE CONNECTION-GUSSET PLATE

CROSS-REFERENCE TO RELATED APPLICATIONS

The present application claims priority under 35 U.S.C. § 119 to European Patent Application No. EP 13164327.2 (filed on (Apr. 18, 2013), which is hereby incorporated by reference in its entirety.

TECHNICAL FIELD

Embodiments relate to a hollow profile connection to connect at least two hollow profiles, with a gusset plate which makes contact with the end regions of the hollow profiles to be connected, in the outer region thereof. At least the end regions of the hollow profiles in cross-section have a profile formed by webs or ribs. The gusset plate and hollow profile may be connected to each other by a friction-stir weld, the connections produced by friction-stir welding running along the ribs or webs of the profile.

BACKGROUND

Metallic hollow profiles are frequently and effectively connected by way of gusset plates which are arranged between the profiles and are subsequently connected thereto by welds. For weight reasons, in motor vehicle manufacturing, use is generally made of hollow profiles consisting of aluminium, and the gusset plates are likewise manufactured from aluminium.

During the formation of conventional welds, a high amount of heat is applied, causing distortion of the assembly. The dimensional accuracy is negatively influenced. In order to produce flat and therefore stable connections, holes have to be made in the plates in order to form plug or slot welds. Furthermore, during the welding, there are sputters which have to be removed in a complicated manner from the surfaces.

By way of friction-stir welding, or indirect friction-stir welding, plates consisting of aluminium may be connected to one another with a low application of heat. The plates are placed one above the other and the friction-stir welding tool is placed onto the upper side of the one plate under pressure and moved along a designated connecting line. A connection is produced. However, use in the case of hollow profiles is not possible.

German Patent Publication No. DE 10 2010 018 504 A1 discloses a method for producing a hollow profile using friction-stir welding. A semi-finished component consisting of an aluminium alloy is connected along a connecting line by way of a weld formed by friction-stir welding. During the welding, a counter holder which supports the welding zone from the lower side is introduced into the profile.

The welding of two plates lying in one plane along the contact line thereof by way of friction-stir welding is described by German Patent Publication No. DE 10 2010 003 742 A1.

The connection of two plates adjacent to each other in a plane on a hollow profile is illustrated in Japanese Patent Publication No. JP 2004 261 859 A. By way of a tool, the plates are welded to each other along the border, which forms a gap, by way of friction-stir welding, at the same time a metal strip is also placed into the gap.

The production of a hollow profile part by joining together two shaped parts and by connecting the shaped parts along the joining line by way of friction-stir welding is illustrated in Japanese Patent Publication No. JP 2001 233 208 A.

A method for producing a low-twist frame structure by lap-welding is illustrated in German Patent Publication No. DE 100 11 593 A1. A T-shaped gusset piece which is inserted into the tube ends to be connected serves here as a connecting element for three tubes. The tube end region overlapping the inserted gusset piece is friction-stir welded by way of a revolving tool such that the tube material may be connected to the material of the gusset piece in the context of a friction-stir weld.

Japanese Patent Publication No. JP 11 226 759 A also describes the connection of profile parts by way of friction-stir welding. The parts which are to be connected to one another are oriented with respect to one another, and a pressure piece absorbing the compressive forces occurring during the friction-stir welding is welded at the same time in the contact region of the parts.

SUMMARY

Embodiments relate to a hollow profile connection in a design which is enhanced in relation to the known types.

In accordance with embodiments, in order to connect at least two hollow profiles, at least one gusset plate is provided, which gusset plate makes contact with the hollow profiles in the end region thereof, in the outer region. The end regions of the hollow profiles in cross-section have a profile formed by webs or ribs. The gusset plate and hollow profile part are connected to each other by a friction-stir weld. The connections, which are produced by friction-stir welding, between gusset plate and hollow profile run along the ribs or webs, i.e., in the direction of extent of the respective hollow profile precisely in the region which is correspondingly pressure-tight because of the web or the rib. The connections produced by friction-stir welding may be designed to be punctiform and/or continuous and/or linear.

In accordance with embodiments, the hollow profiles are designed as extruded profiles and have a hollow chamber profile formed by webs or ribs. The webs or ribs running transversely through the hollow profile configure the hollow profile in a correspondingly pressure-tight manner.

In accordance with embodiments, profiles which result in the required compressive strength are inserted into the ends of the hollow profiles.

The profile parts inserted into the ends of the hollow profiles may be designed having an X-, star- or H-shaped or cross-section, in which the external dimensions thereof are matched to the internal contour of the hollow profile. The profile part may be produced as an aluminium casting, extruded part or strand cast part. After insertion into the profile, the ribs protruding substantially radially outwards in a designated number are in contact with the inner side of the profile and thus make it possible to absorb pressure exerted on the hollow profile from the outside.

The gusset plate is connected to the hollow profile and the inserted profile part by way of at least one friction-stir weld. The friction-stir weld runs along one of the ribs which are in contact with the hollow profile in the interior thereof. A plurality of friction-stir welds may be formed along the ribs which are in contact with the hollow profile part on the inside.

The gusset region which connects the at least two hollow profiles to each other may be formed by two gusset plates, wherein the latter are fitted together in the form of two half shells surrounding the ends of the hollow profiles. The friction-stir welds may be formed here in the region of the hollow profile overlap along the ribs of the inserted profile parts. In addition, friction-stir welds may also be formed in the contact region of the gusset plates. The gusset plates may have one or more regions which are designed as contact and connecting strips and in which the friction-stir welds serving for the connection may be formed.

In a development of the invention, in addition to the gusset plate, a gusset element designed as a cast gusset part, is inserted into the ends of the hollow profiles. The sections inserted into the ends of the hollow profiles are designed in the same manner as the profile parts, for example as H-, X- or star-shaped profile with ribs protruding substantially radially outwards. Also in the case of this embodiment, the friction-stir welds are formed in the region of the overlap between gusset plate and hollow profile along the ribs of that end of the gusset cast part which is inserted in the respective hollow profile.

In accordance with embodiments, a connector to connect at least two hollow profiles may include at least one of: a gusset plate which makes contact with end regions of the at least two hollow profiles, in the outer region thereof, wherein at least the end regions of the hollow profiles in cross-section have a profile formed by webs or ribs, wherein the gusset plate is connected to the at least two hollow profiles by a friction-stir weld which run along the ribs or webs of the at least two hollow profiles.

In accordance with embodiments, a connector to connect at least two hollow profiles may include at least one of: a gusset plate which makes contact with end regions of the at least two hollow profiles, in the outer region thereof, wherein at least the end regions of the hollow profiles in cross-section have a profile formed by webs or ribs, wherein the gusset plate is connected to the at least two hollow profiles by a friction-stir weld which run along the ribs or webs of the at least two hollow profiles; and connector body parts to attach to the at least two hollow profiles in the region of and along the webs forming the ribbing or the profile by way of connections formed by friction-stir welding.

In accordance with embodiments, a connector to connect at least two hollow profiles may include at least one of: a pair of gusset plates which each make contact with end regions of the at least two hollow profiles, in the outer region thereof, wherein at least the end regions of the at least two hollow profiles in cross-section have a profile formed by webs or ribs, wherein: the gusset plates are connected to the at least two hollow profiles by a friction-stir weld which run along the ribs or webs of the at least two hollow profiles, and the gusset plates comprise half-shelves which are connected to each other.

DRAWINGS

Embodiments are described by way of example below with reference to the drawings.

DESCRIPTION

Figure 1:
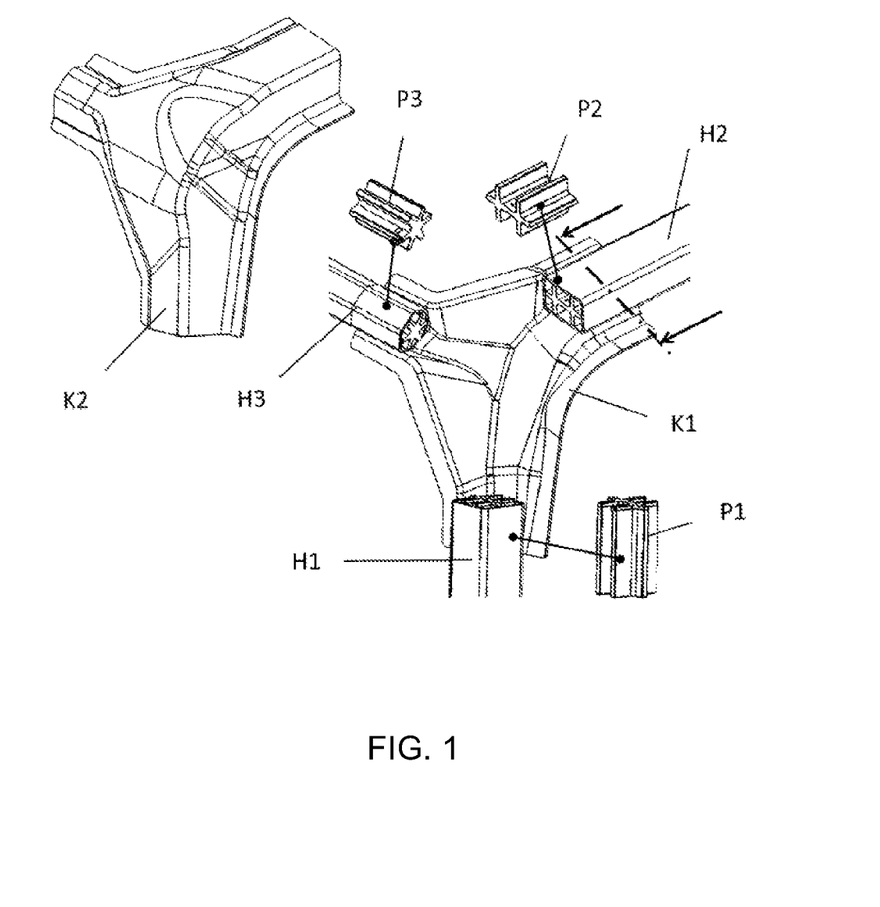
FIG. 1 illustrates a perspective view of a connection of three hollow profiles with inserted profile pieces and two gusset plates, in accordance with embodiments.

FIG. 1 illustrates a connection of three hollow profiles H1, H2, H3 with inserted profile pieces P1, P2, P3 and two gusset plates K1, K2. The gusset plate K1 is fitted here from below onto the three end regions of the hollow profiles H1, H2, H3 and is in contact therewith. The second gusset plate K2 which is to be fitted from above is not yet in the final position.

Profile pieces P1, P2, P3 manufactured as extruded parts may be inserted into the open ends of the hollow profiles H1, H2, H3. In FIG. 1, the profile pieces P1, P2, P3 are both inserted into the respective end and also illustrated separately in a position next to the associated end of the hollow profile part H1, H2, H3. The hollow profiles H1, H2, H3 have a different cross section and, correspondingly, the profile pieces P1, P2, P3 to be inserted may be designed as differently ribbed profiles.

Figure 2:
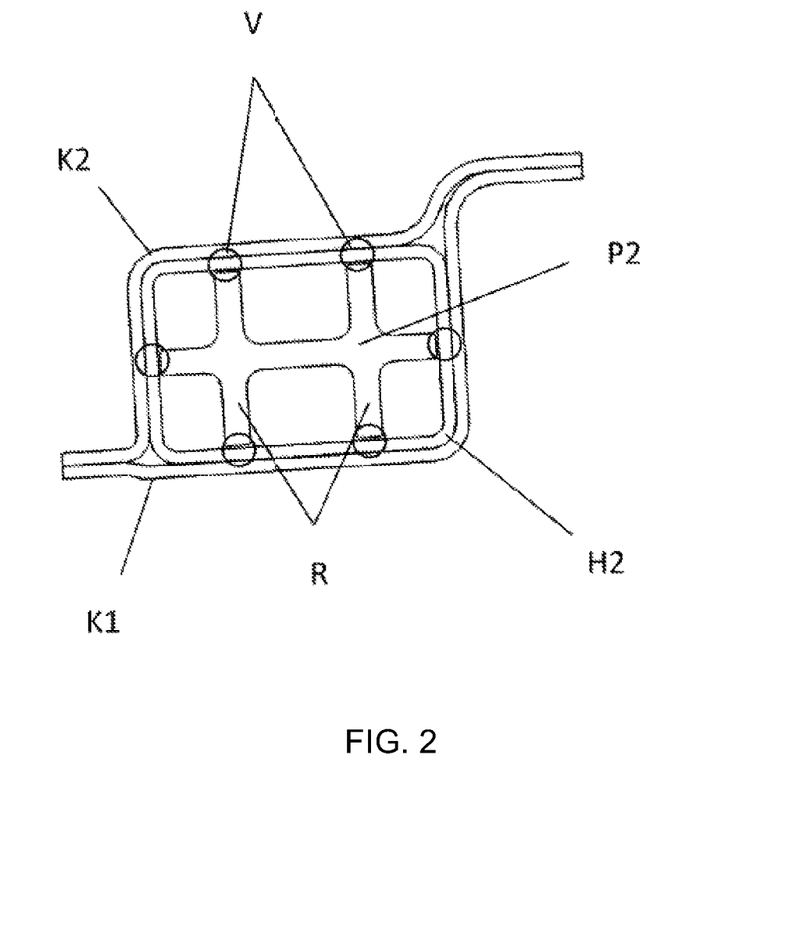
FIG. 2 illustrates a front sectional view through an end of a hollow profile in the region where the hollow profile is surrounded by two gusset plates, with the inserted profile piece and the connections produced by friction-stir welding.

FIG. 2 illustrates a section through an end of the hollow profile H2 in the region where the latter is surrounded by the two gusset plates K1, K2. In FIG. 1, the section and the direction of view are indicated. The inserted profile piece P2 and the connections V produced by the friction-stir welding may be reproduced. The connections V produced by friction-stir welding may be designed as linear or punctiform welds along the ribs R of the profile part P2 and connect the gusset plate K1 or K2, the hollow profile H2 and the rib R of the profile part P2, the rib being in contact with the hollow profile H2 on the inside.

Figure 3:
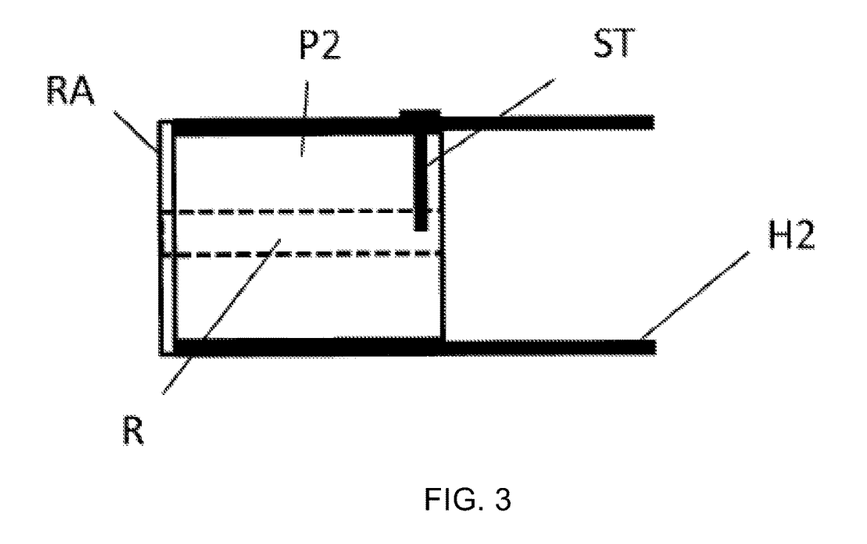
FIG. 3 illustrates a side sectional view, running in a direction of extent of a hollow profile, in the end region of the section with the inserted profile part.

FIG. 3 illustrates a section running in the direction of extent of the hollow profile H2 in the end region with the inserted profile part P2. The profile part P2 is fixed by way of a pin or screw ST and thus secured against falling out. One end of the profile part P2 has an expansion, a widened edge RA designed in the form of an expanded shaped part. The edge RA serves as a stop for the profile part P2 when the latter is introduced into the hollow profile H2, and prevents the profile part P2 from sliding through and dropping into the hollow profile during the insertion and before being fixed with the securing device ST.

Figure 4:
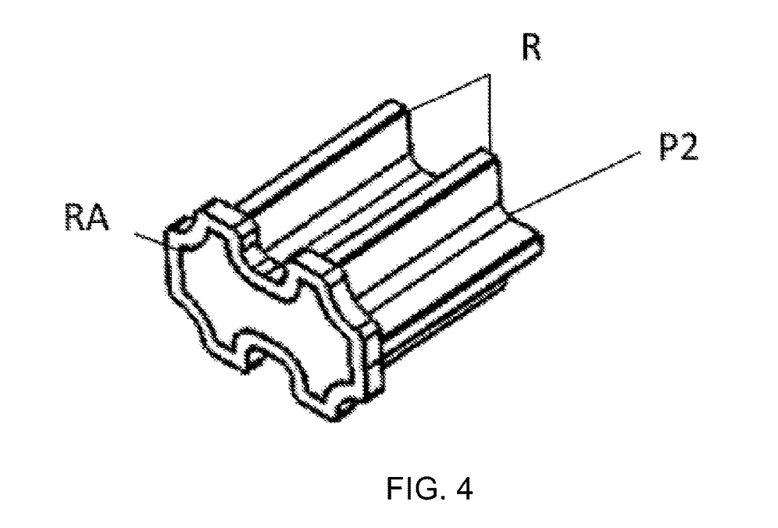
FIG. 4 illustrates a perspective view of a profile part with an edge in the form of an expansion.

FIG. 4 illustrates the profile part P2 with the edge RA in the form of an expansion.

Figure 5:
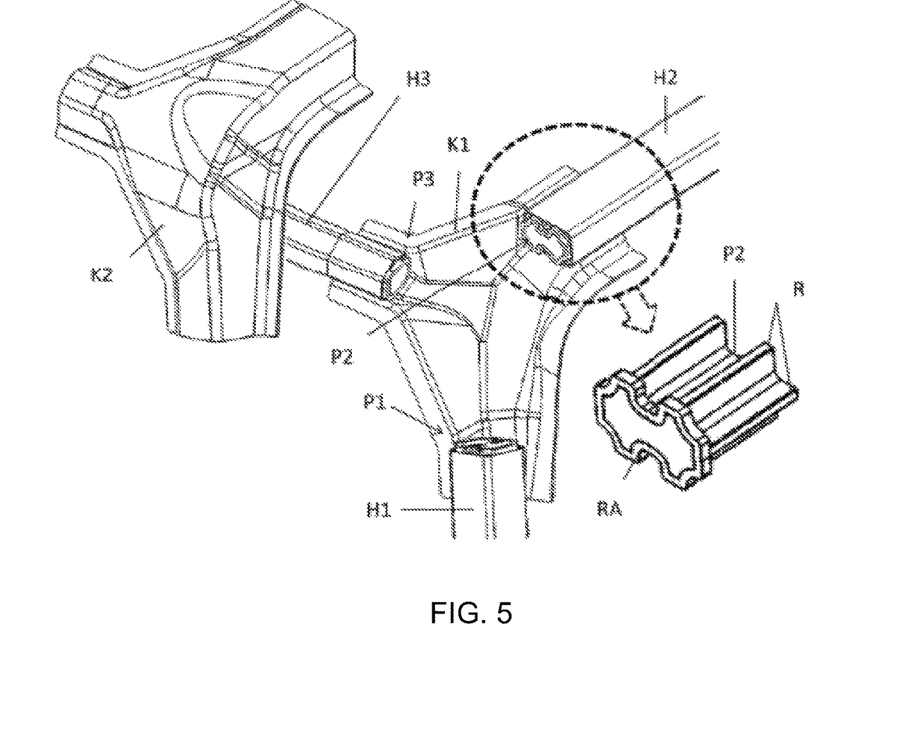
FIG. 5 illustrates a perspective view of the profile parts inserted into the hollow profiles with an edge in the form of an expansion and with the gusset plates.

FIG. 5 illustrates a hollow profile connection with two gusset plates K1, K2 and three hollow profiles H1, H2, H3. Profile parts P1, P2, P3 each having an edge RA in the form of an expansion may be inserted into the ends of the hollow profiles H1, H2, H3. The profile part P2 which is inserted into the hollow profile part H2 and has the edge RA, designed as in FIG. 4, is additionally reproduced in enlarged form.

Figure 6A:
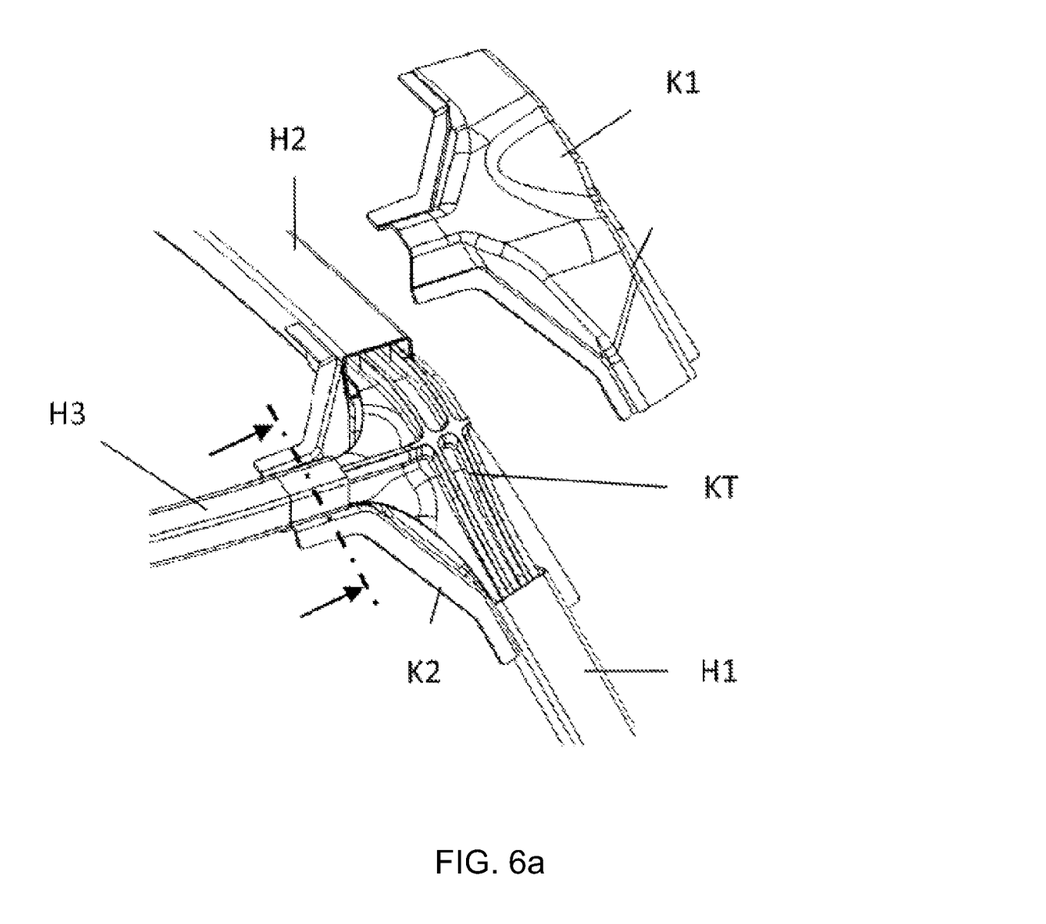
FIGS. 6a and 6b illustrate a gusset plates and a gusset part designed as a cast part, in accordance with embodiments.

FIG. 6a illustrates a further embodiment, in which, in addition to the gusset plates K1, K2, a gusset part KT, designed as a cast part, with the ends in profiled form, is inserted into the hollow profiles H1, H2, H3.

Figure 6B:
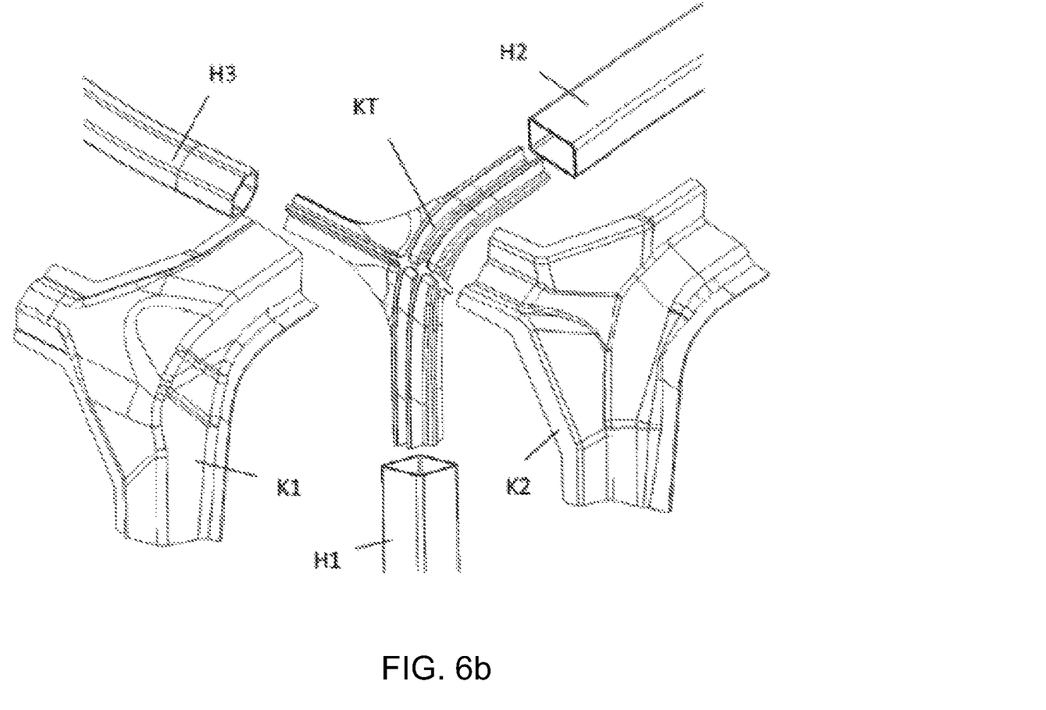

In FIG. 6b, the parts, the hollow profiles H1, H2, H3, the gusset plates K1, K2 and the gusset part may be reproduced in the manner of an exploded illustration. Overall, those ends of the gusset part K2 which face the hollow profiles H1 and H2 are also angled to a greater degree, the hollow profiles H1 and H2 may be substantially at a right angle to each other.

Figure 7:
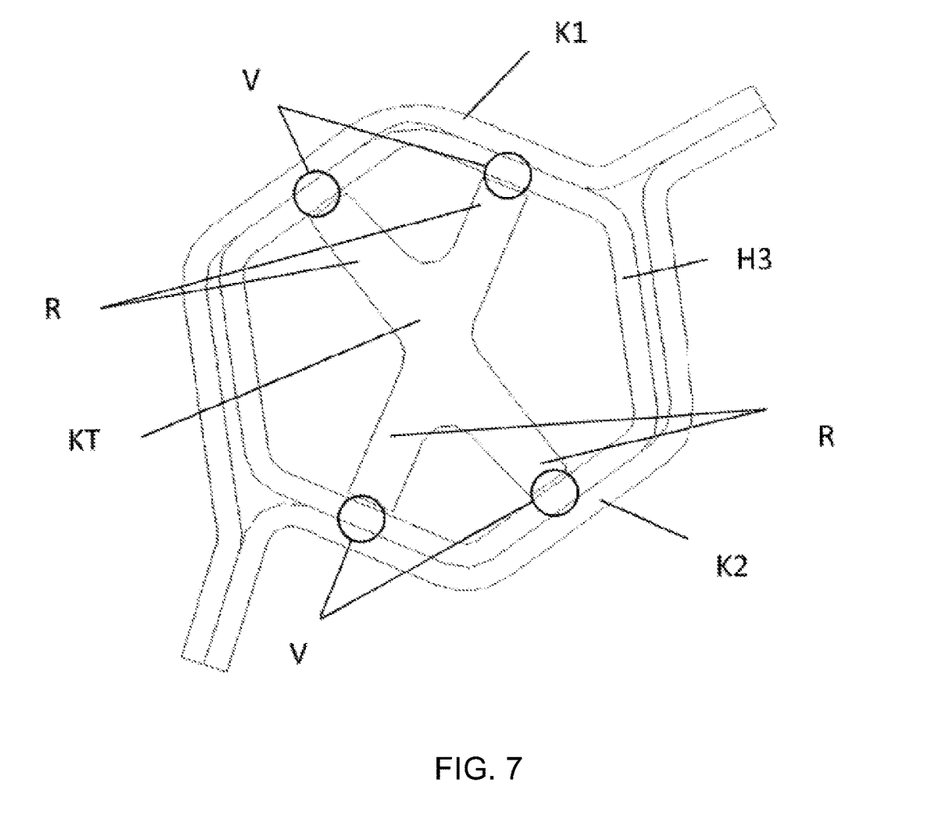
FIG. 7 illustrates a front sectional view through the hollow profile, with an inserted end of the gusset part and the gusset plates and the connections formed by friction-stir welding.

FIG. 7 illustrates the section, which is marked in FIG. 6a, through the hollow profile H3 with the inserted end of the gusset part KT. The connections V produced by friction-stir welding, the welds or friction-stir welds, may be formed along the ribs R of the profile part P2. By way of the connections V, the gusset plates K1, K2, the hollow profile H3 and the gusset part K2 may be connected by way of its ribs R.

Figure 8:
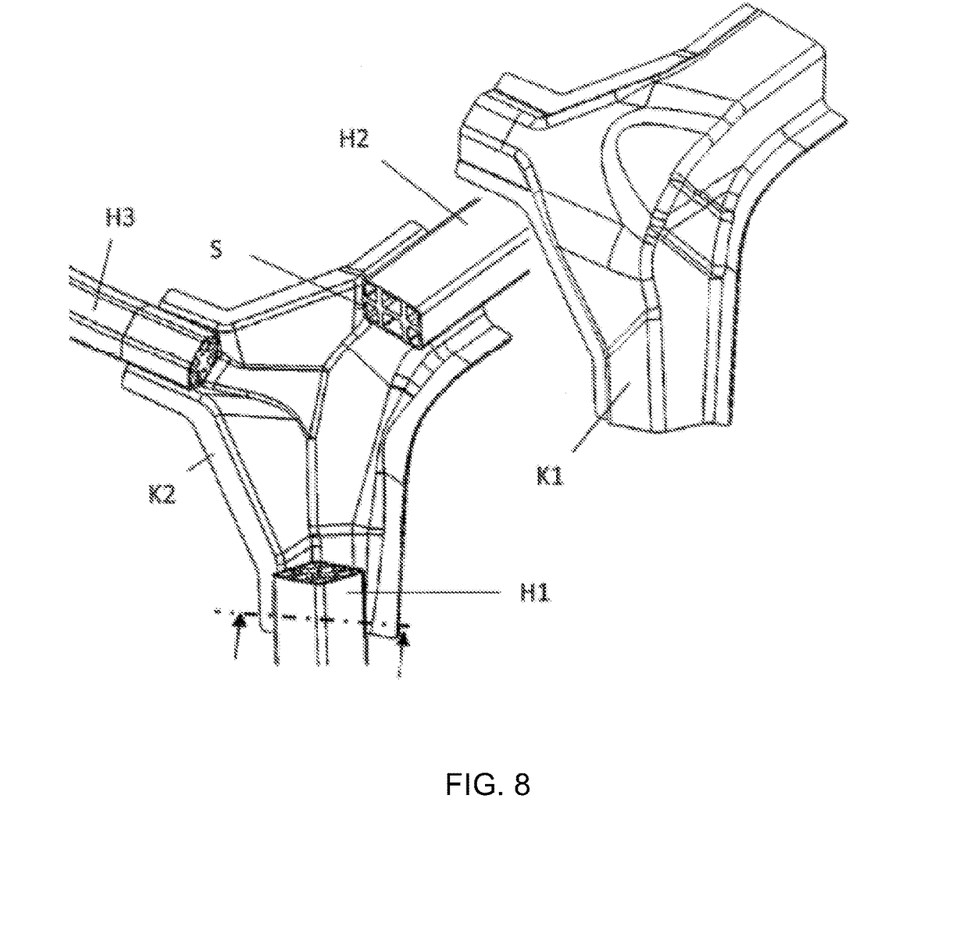
FIG. 8 illustrates one or more hollow profiles have ribbing in the interior, in accordance with embodiments.

FIG. 8 illustrates an embodiment that uses hollow profiles H1, H2, H3 which already have an internal ribbing in the form of webs and thus form individual hollow chambers. The hollow profiles H1, H2, H3 may be designed as extruded profiles and may be connected in the manner already described to two gusset plates K1, K2. The connections V, which may be formed by friction-stir welding, between the gusset plates K1, K2 and the hollow profiles H1, H2, H3 run in the region of and along the struts or webs S forming the ribbing.

Figure 9:
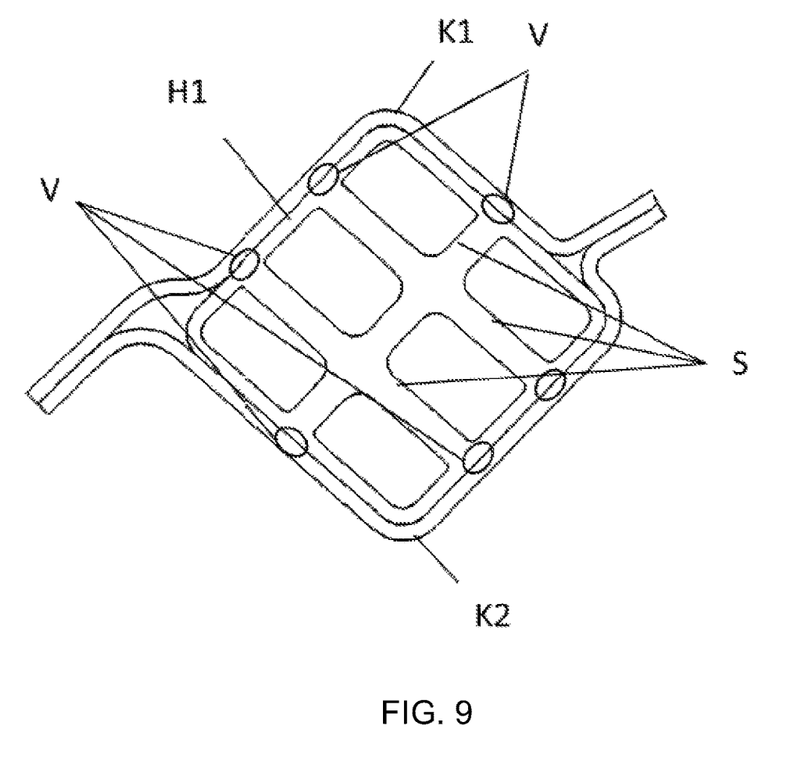
FIG. 9 illustrates a front sectional view through the ribbed hollow profile with the attached gusset plates and the friction-stir welds.

FIG. 9 reproduces in detail the section, which is illustrated in FIG. 8, through the hollow profile which is designed as an extruded profile and has the gusset plates K1, K2 and the connections V which may be formed in the region of and along the webs S and may be produced by friction-stir welding. The connections may be formed in the region of and along the webs S forming the ribbing.

The use of profiled hollow profiles in the form of extruded profiles permits an additional fixing of further body parts to one or more of the hollow profiles.

Figure 10:
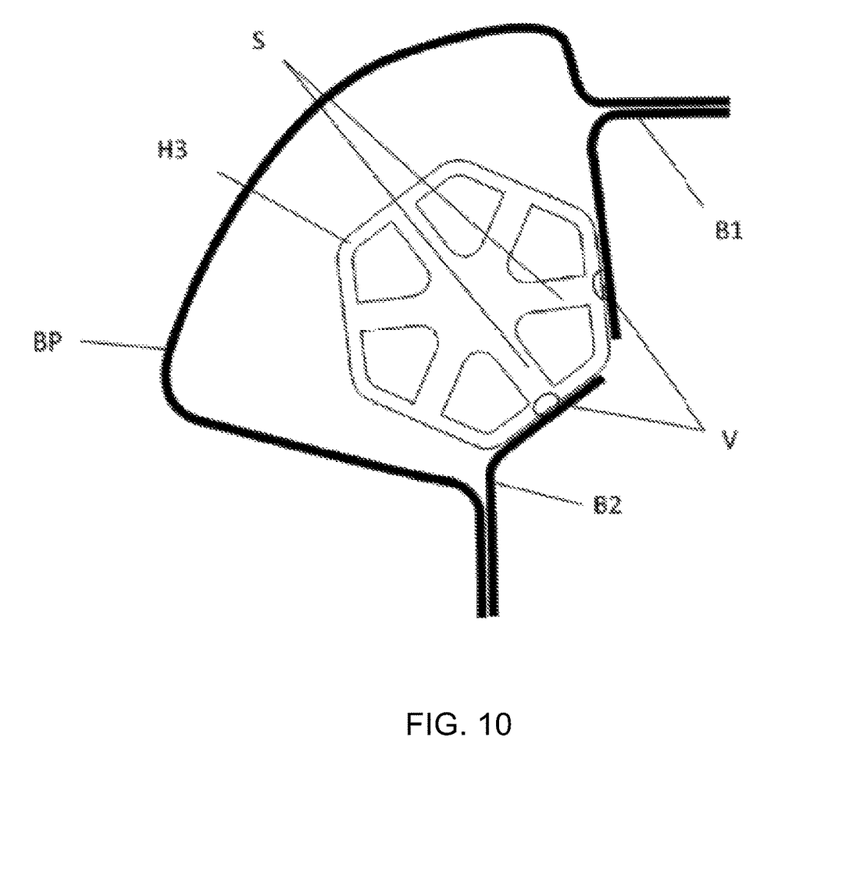
FIG. 10 illustrates a front sectional view of the fixing of additional plates to the hollow profile, which is in the form of an extruded profile, and a panel with a further plate.

FIG. 10 illustrates the attaching of two holding plates B1, B2 to the profiled hollow profile H3, for example, as illustrated in FIG. 9. The plates B1, B2 may be attached to the hollow profile H3 by way of a respective connection V produced by friction-stir welding, wherein the connections V may be formed precisely in the region in which the web S of the ribbing of the hollow profile H3 leads from the inside onto the outer contour. The connection likewise runs in the direction of the hollow profile H2, that is to say of the web S. A panel plate BP covering the hollow profile H3 is attached to the two plates B1, B2. A friction-stir weld, but also a spot weld or a punched riveted connection may be likewise suitable here as the connection.

Figure 11:
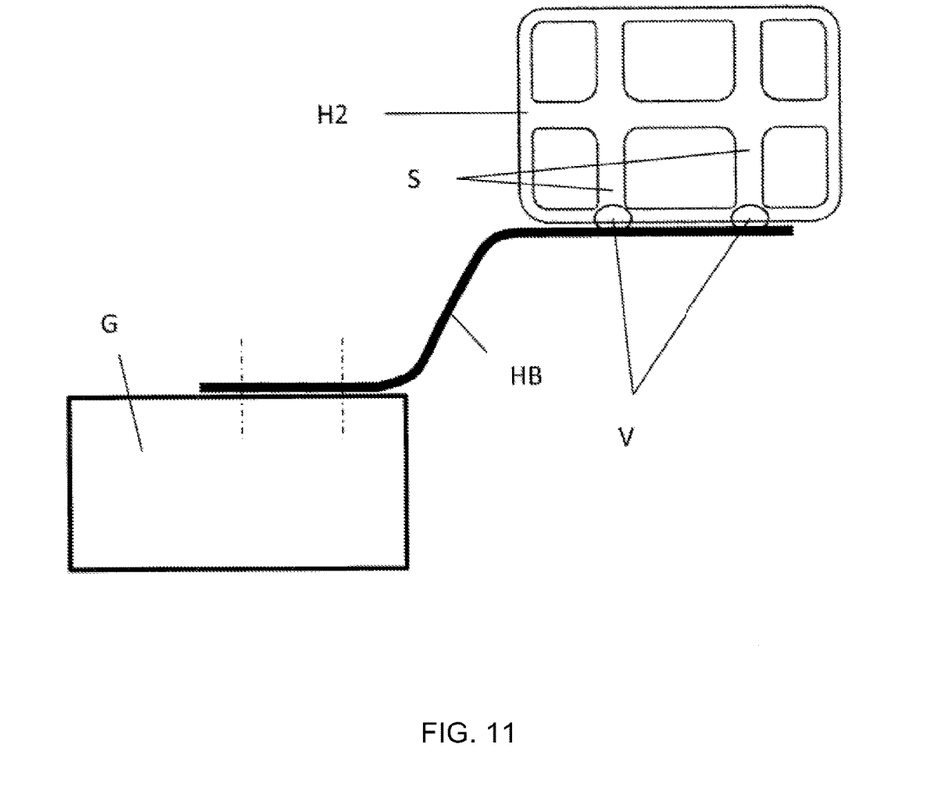
FIG. 11 illustrates a front sectional view of the attaching of a device or an apparatus to a hollow profile in the form of an extruded profile.

FIG. 11 illustrates a further measure developing the present invention, in which a device, for example an electronic control device, is attached by way of a holding plate HB to the hollow profile H2 in the form of an extruded profile (as illustrated in FIG. 8). The holding plate HB is connected to the hollow profile by way of two connections formed by friction-stir welding. The connections V may be formed precisely in the region in which the web S of the ribbing of the hollow profile H3 leads from the inside onto the outer contour. The connection likewise runs in the direction of the hollow profile H2, i.e., of the web S.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

H1 Hollow profile
H2 Hollow profile
H3 Hollow profile
K1 Gusset plate
K2 Gusset plate
P1 Profile part
P2 Profile part
P3 Profile part
R Rib
S Web
RA Edge
ST Pin
KT Gusset part
V Friction-stir welding connection
B1 Plate, body part
B2 Plate, body part
BP Panel, panel plate
HB Holding plate
G Device, apparatus, control device

What is claimed is:

1. A connector arrangement, comprising:
at least two hollow profiles, each having inserted at open end regions thereof a profile part formed by webs, the profile part having an X-shaped or an H-shaped cross-section formed as ribs protruding radially outward towards to contact an inner surface of the at least two hollow profiles to absorb outside pressure exerted on the outer surface of the at least two hollow profiles;
a gusset plate to contact outer regions of the at least two hollow profiles and thereby connect the at least two hollow profiles; and
a plurality of friction-stir weld connectors to extend along the ribs of the profile part in a longitudinal direction of the profile part and in regions of the at least two hollow profiles that overlap along the ribs of the profile part, to thereby connect the gusset plate, the at least two hollow profiles, and the profile part to each other,
wherein the ribs are arranged inside an interior space defined by walls of the at least two hollow profiles to form struts which reinforce the at least two hollow profiles against pressure during formation of the friction-stir weld connectors.

2. The connector arrangement of claim 1, wherein the at least two hollow profiles have a hollow chamber profile formed by the webs.

3. The connector arrangement of claim 1, wherein the at least two hollow profiles are of tubular configuration having the profile part.

4. The connector arrangement of claim 3, wherein the insertable profile part is fixed in the hollow profile by way of a fastening device.

5. The connector arrangement of claim 4, wherein the fastening device comprises a pin or a screw.

6. The connector arrangement of claim 3, wherein the insertable profile part has an edge region which serves as a stop when the insertable profile part is inserted into the at least two hollow profiles.

7. The connector arrangement of claim 3, wherein the at least two hollow profile parts comprise extruded profile parts.

8. The connector arrangement of claim 3, wherein the at least two hollow profile parts are composed of aluminum or an aluminum alloy.

9. The connector arrangement of claim 1, wherein ribbed ends of a gusset part additionally connecting the hollow profiles are inserted into the end regions of the at least two hollow profiles.

10. The connector arrangement of claim 9, wherein the gusset part comprises a cast aluminum component.

11. The connector arrangement of claim 1, wherein the at least two hollow profiles comprise extruded profile parts.

12. The connector arrangement of claim 11, further comprising: a holding plate for an electronic control device, which is attached to the at least two hollow profiles in the region of and along the webs forming the ribbing or the profile by way of connections formed by the friction-stir welding.

13. The connector arrangement of claim 1, wherein the at least two hollow profiles are composed of aluminum or an aluminum alloy.

14. The connector arrangement of claim 1, wherein:
the at least two hollow profiles have a different cross-section; and
each profile part for the at least two hollow profiles has a different cross-section.

15. A connector arrangement, comprising:
at least two hollow profiles;
an insertable profile part received at respective open end regions of the at least two profiles, the profile part having webs formed as ribs having external dimensions that are matched to an internal contour of the at least two hollow profiles;
a gusset plate to contact outer regions of the at least two hollow profiles and thereby connect the at least two hollow profiles to each other; and
a plurality of friction-stir weld connectors to extend along the ribs of the insertable profile part in a longitudinal direction of the insertable profile part and in regions of the at least two hollow profiles that overlap along the ribs of the insertable profile part, to thereby connect the gusset plate, the at least two hollow profiles, and the insertable profile part to each other,
wherein the ribs are arranged inside an interior space defined by walls of the at least two hollow profiles to form struts which reinforce the at least two hollow profiles against pressure during formation of the friction-stir weld connectors.

16. The connector arrangement of claim 15, wherein:
the at least two hollow profiles have a different cross-section; and
each insertable profile part for the at least two hollow profiles has a different cross-section.

17. A connector arrangement, comprising:
at least two hollow profiles;
an insertable profile part received at respective open end regions of the at least two profiles, the insertable profile part having webs formed as ribs having external dimensions that are matched to an internal contour of the at least two hollow profiles;
a pair of gusset plates to contact end regions of the at least two hollow profiles and thereby connect the at least two hollow profiles to each other, the gusset plates including half-shelves which are connected to each other; and
a plurality of friction-stir weld connectors to extend along the ribs of the insertable profile part in a longitudinal direction of the insertable profile part and in regions of the at least two hollow profiles that overlap the ribs of the insertable profile part, to thereby connect the gusset plates, the at least two hollow profiles, and the insertable profile part to each other,
wherein the ribs are arranged inside an interior space defined by walls of the at least two hollow profiles to form struts which reinforce the at least two hollow profiles against pressure during formation of the friction-stir weld connectors.

18. The connector arrangement of claim 17, wherein:
the at least two hollow profiles have a different cross-section; and
each insertable profile part for the at least two hollow profiles has a different cross-section.

* * * * *